United States Patent
Lee et al.

(10) Patent No.: US 7,835,741 B2
(45) Date of Patent: Nov. 16, 2010

(54) METHOD FOR SELECTING SYSTEM IN A MOBILE TERMINAL

(75) Inventors: Jong-Suk Lee, Suwon-si (KR); Seo-Weon Heo, Seoul (KR)

(73) Assignee: Samsung Electronics Co., Ltd (KR)

( * ) Notice: Subject to any disclaimer, the term of this patent is extended or adjusted under 35 U.S.C. 154(b) by 856 days.

(21) Appl. No.: 11/716,250

(22) Filed: Mar. 9, 2007

(65) Prior Publication Data

US 2007/0275719 A1 Nov. 29, 2007

(30) Foreign Application Priority Data

Mar. 9, 2006 (KR) .................. 10-2006-0022388

(51) Int. Cl.
 *H04W 4/00* (2009.01)

(52) U.S. Cl. .................. 455/435.2; 455/434; 455/435.1; 455/435.3

(58) Field of Classification Search .................. 455/558, 455/432.1–434, 435.1–435.3, 456.1–456.6, 455/115.1–115.4
See application file for complete search history.

(56) References Cited

U.S. PATENT DOCUMENTS

| | | | |
|---|---|---|---|
| 2003/0083064 A1* | 5/2003 | Cooper | 455/432 |
| 2004/0110503 A1* | 6/2004 | Park | 455/435.1 |
| 2004/0152462 A1* | 8/2004 | Hwang | 455/432.1 |
| 2005/0148332 A1* | 7/2005 | Buckley et al. | 455/435.2 |

* cited by examiner

*Primary Examiner*—Rafael Pérez-Gutiérrez
*Assistant Examiner*—Neda Behrooz
(74) *Attorney, Agent, or Firm*—The Farrell Law Firm, LLP

(57) ABSTRACT

A method for selecting a system in a mobile terminal is disclosed. The method includes upon power-up of the mobile terminal, reading system information included in a Most Recently Used (MRU) table from memory, and registering the system information in a variable area of a system search table; reading system information from a Preferred Roaming List Acquisition (PRL ACQ) table stored in the memory, and registering the system information in a fixed area of the system search table; and performing system search based on the system search table.

18 Claims, 10 Drawing Sheets

FIG.3

| Index (320) | System (322) | Band (324) | Channel (326) | Repetition Flag (328) |
|---|---|---|---|---|
| 0 | CDMA | 0 | 150 | INACTIVE |
| 1 | CDMA | 1 | 200 | INACTIVE |
| 2 | CDMA | 0 | 200 | INACTIVE |
| 3 | NONE | NONE | NONE | INACTIVE |
| ... | NONE | NONE | NONE | INACTIVE |
| MAX1 | AMPS | 0 | 100 | INACTIVE |
| MAX1 + 1 | AMPS | 0 | 200 | INACTIVE |
| MAX1 + 2 | AMPS | 0 | 100 | INACTIVE |
| MAX1 + 3 | AMPS | 0 | 200 | INACTIVE |
| MAX1 + 4 | AMPS | 0 | 100 | INACTIVE |
| MAX1 + 5 | AMPS | 1 | ... | ... |
| ... | ... | ... | ... | ... |
| MAX2 | CDMA | 4 | 1000 | INACTIVE |
| MAX1 + 1 | AMPS | 0 | 100 | INACTIVE |
| MAX1 + 2 | AMPS | 0 | 200 | INACTIVE |
| MAX1 + 3 | HDR | 0 | 300 | INACTIVE |
| ... | ... | ... | ... | ... |
| MAX3 | HDR | 0 | 1000 | INACTIVE |

IN-USE AREA (308)
RESERVED AREA (310)

Area 1 (VARIABLE AREA)
area name : AREA_1
start index : 0
end index : MAX1
MAX SIZE OF AREA_1 : MAX1
(302)

Area 2 (FIXED AREA)
area name : AREA_2
start index : MAX1 + 1
end index : MAX2
MAX SIZE OF AREA_2 : MAX2
(304)

Area 3 (FIXED AREA)
area name : AREA_3
start index : MAX2 + 1
end index : MAX3
MAX SIZE OF AREA_3 : MAX3
(306)

FIG.4

| Index | system | band-class | channel | repetition_flag |
|---|---|---|---|---|
| 0 | CDMA (0x01) | DCS (0x00) | 738 | INACTIVE |
| 1 | CDMA (0x01) | DCS (0x00) | 386 | INACTIVE |
| 2 | Inactive (0xFF) | Inactive (0xFF) | FFFF | INACTIVE |
| 3 | Inactive (0xFF) | Inactive (0xFF) | FFFF | INACTIVE |
| 4 | Inactive (0xFF) | Inactive (0xFF) | FFFF | INACTIVE |
| 5 | Inactive (0xFF) | Inactive (0xFF) | FFFF | INACTIVE |
| 6 | CDMA (0x01) | DCS (0x00) | 29 | INACTIVE |
| 7 | CDMA (0x01) | DCS (0x00) | 111 | INACTIVE |
| 8 | CDMA (0x01) | DCS (0x00) | 738 | INACTIVE |
| 9 | CDMA (0x01) | DCS (0x00) | 779 | INACTIVE |
| 10 | CDMA (0x01) | USPCS (0x01) | 50 | INACTIVE |
| 11 | CDMA (0x01) | USPCS (0x01) | 100 | INACTIVE |
| 12 | AMPS (0x00) | DCS (0x00) | 29 | INACTIVE |
| 13 | AMPS (0x00) | DCS (0x00) | 111 | INACTIVE |
| 14 | CDMA (0x01) | DCS (0x00) | 283 | INACTIVE |
| 15 | CDMA (0x01) | DCS (0x00) | 691 | INACTIVE |
| 16 | CDMA (0x01) | DCS (0x00) | 405 | INACTIVE |
| 17 | CDMA (0x01) | DCS (0x00) | 255 | INACTIVE |
| 18 | Inactive (0xFF) | Inactive (0xFF) | FFFF | INACTIVE |
| 19 | Inactive (0xFF) | Inactive (0xFF) | FFFF | INACTIVE |
| 20 | Inactive (0xFF) | Inactive (0xFF) | FFFF | INACTIVE |
| 21 | Inactive (0xFF) | Inactive (0xFF) | FFFF | INACTIVE |
| … | … | … | … | … |

Search table

Area 1 (MRU Table): rows 0–5 (400)
Area 2 (PRL ACQ Table): rows 6–13 (402)
Area 3 (EMR CH Table): rows 14–17 (404)
Area 4 (SRDM System): rows 18–21 (406)

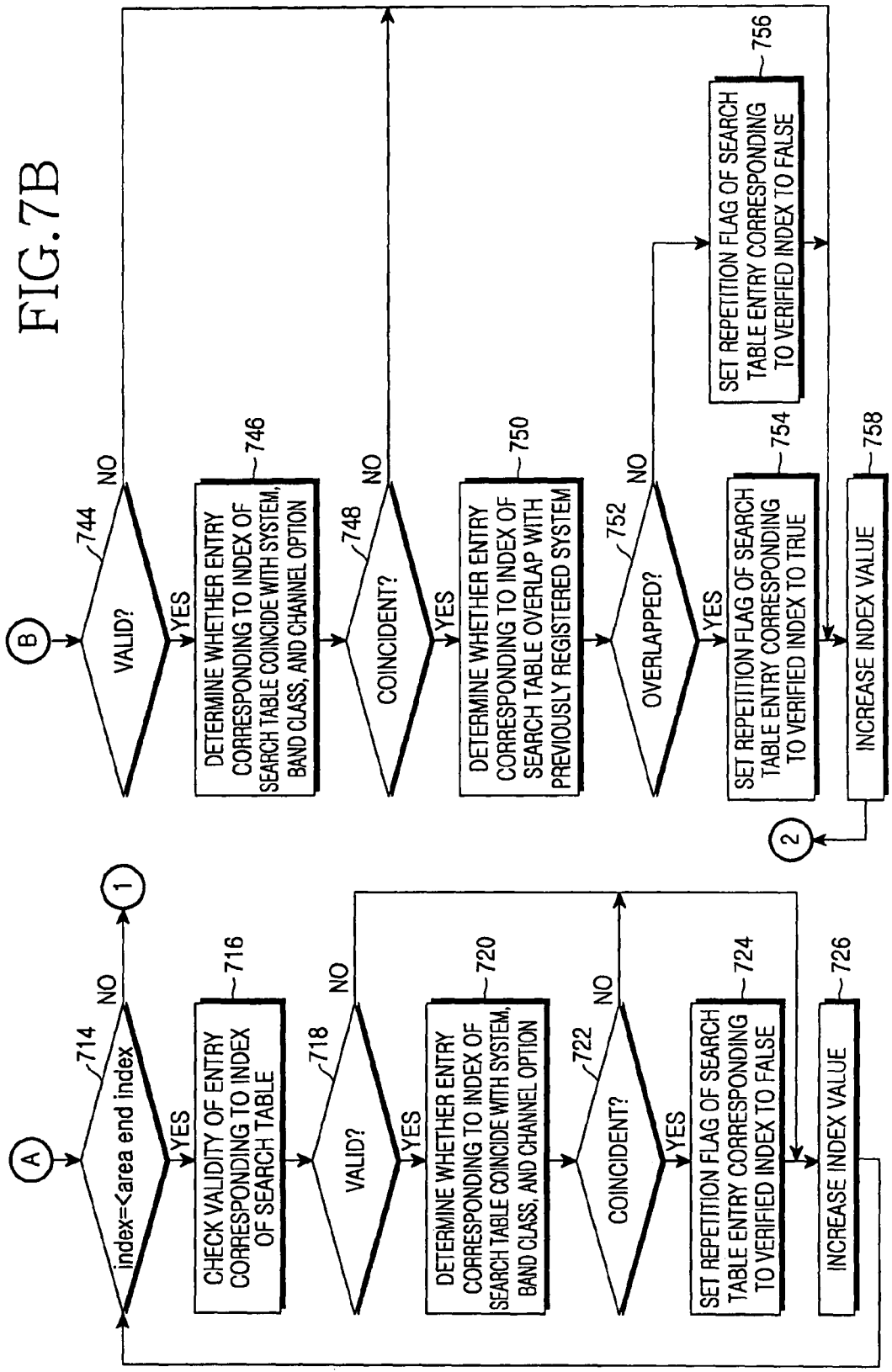

| Index | system | band-class | system | repetition_flag | |
|---|---|---|---|---|---|
| 0 | CDMA (0x01) | DCS (0x00) | 738 | FALSE | ⎤ SCENARIO 1 (802) |
| 1 | CDMA (0x01) | DCS (0x00) | 386 | FALSE | ⎦ |
| 2 | Inactive (0xFF) | Inactive (0xFF) | FFFF | INACTIVE | |
| 3 | Inactive (0xFF) | Inactive (0xFF) | FFFF | INACTIVE | |
| 4 | Inactive (0xFF) | Inactive (0xFF) | FFFF | INACTIVE | |
| 5 | Inactive (0xFF) | Inactive (0xFF) | FFFF | INACTIVE | |
| 6 | CDMA (0x01) | DCS (0x00) | 29 | FALSE | ⎤ OVERLAP WITH INDEX 0 OF SCENARIO 1 (EXCLUDED) (842) |
| 7 | CDMA (0x01) | DCS (0x00) | 111 | FALSE | |
| 8 | CDMA (0x01) | DCS (0x00) | 738 | TRUE | ⎤ SCENARIO 2 (804) |
| 9 | CDMA (0x01) | DCS (0x00) | 779 | FALSE | |
| 10 | CDMA (0x01) | USPCS (0x01) | 50 | FALSE | |
| 11 | CDMA (0x01) | USPCS (0x01) | 100 | FALSE | |
| 12 | AMPS (0x00) | DCS (0x00) | 29 | FALSE | |
| 13 | AMPS (0x00) | DCS (0x00) | 111 | FALSE | ⎦ |
| 14 | CDMA (0x01) | DCS (0x00) | 283 | INACTIVE | |
| 15 | CDMA (0x01) | DCS (0x00) | 691 | INACTIVE | |
| 16 | CDMA (0x01) | DCS (0x00) | 405 | INACTIVE | |
| 17 | CDMA (0x01) | DCS (0x00) | 255 | INACTIVE | |
| 18 | CDMA (0xFF) | DCS (0xFF) | 779 | INACTIVE | |
| 19 | CDMA (0xFF) | DCS (0xFF) | 338 | INACTIVE | |
| 20 | Inactive (0xFF) | Inactive | FFFF | INACTIVE | |
| 21 | Inactive (0xFF) | Inactive | FFFF | INACTIVE | |
| ... | ... | ... | ... | ... | |

Areas:
- Area 1 (MRU Table) (806): indices 0–5
- Area 2 (PRL ACQ Table) (808): indices 6–13
- Area 3 (EMR CH Table) (810): indices 14–17
- Area 4 (SRDM System) (812): indices 18–21

Search table

| Index | system | band-class | system | repetition_flag | |
|---|---|---|---|---|---|
| 0 | CDMA (0x01) | DCS (0x00) | 738 | TRUE | OVERLAP WITH INDEX 8 OF SCENARIO 1 (EXCLUDED) (904) |
| 1 | CDMA (0x01) | DCS (0x00) | 386 | FALSE | SCENARIO 2 (902) |
| 2 | Inactive (0xFF) | Inactive (0xFF) | FFFF | INACTIVE | |
| 3 | Inactive (0xFF) | Inactive (0xFF) | FFFF | INACTIVE | |
| 4 | Inactive (0xFF) | Inactive (0xFF) | FFFF | INACTIVE | |
| 5 | Inactive (0xFF) | Inactive (0xFF) | FFFF | INACTIVE | |
| 6 | CDMA (0x01) | DCS (0x00) | 29 | FALSE | SCENARIO 3 (906) |
| 7 | CDMA (0x01) | DCS (0x00) | 111 | FALSE | |
| 8 | CDMA (0x01) | DCS (0x00) | 738 | FALSE | SCENARIO 1 (908) |
| 9 | CDMA (0x01) | DCS (0x00) | 779 | FALSE | |
| 10 | CDMA (0x01) | USPCS (0x01) | 50 | FALSE | SCENARIO 3 (910) |
| 11 | CDMA (0x01) | USPCS (0x01) | 100 | FALSE | |
| 12 | AMPS (0x00) | DCS (0x00) | 29 | FALSE | |
| 13 | AMPS (0x00) | DCS (0x00) | 111 | FALSE | |
| 14 | CDMA (0x01) | DCS (0x00) | 283 | INACTIVE | |
| 15 | CDMA (0x01) | DCS (0x00) | 691 | INACTIVE | |
| 16 | CDMA (0x01) | DCS (0x00) | 405 | INACTIVE | |
| 17 | CDMA (0x01) | DCS (0x00) | 255 | INACTIVE | |
| 18 | CDMA (0xFF) | DCS (0xFF) | 779 | INACTIVE | |
| 19 | CDMA (0xFF) | DCS (0xFF) | 338 | INACTIVE | |
| 20 | Inactive (0xFF) | Inactive (0xFF) | FFFF | INACTIVE | |
| 21 | Inactive (0xFF) | Inactive (0xFF) | FFFF | INACTIVE | |

Search table

Area 1 (MRU Table) (920): indices 0–5
Area 2 (PRL ACQ Table) (922): indices 6–13
Area 3 (EMR CH Table) (924): indices 14–17
Area 4 (SRDM System) (926): indices 18–21

METHOD FOR SELECTING SYSTEM IN A MOBILE TERMINAL

PRIORITY

This application claims priority under 35 U.S.C. §119(a) to a Korean Patent Application filed in the Korean Intellectual Property Office on Mar. 9, 2006 and assigned Serial No. 2006-22388, the disclosure of which is incorporated herein by reference.

BACKGROUND OF THE INVENTION

1. Field of the Invention

The present invention relates generally to a method for accessing a mobile communication system by a mobile terminal, and in particular, to a method for selecting a system by a mobile terminal.

2. Description of the Related Art

To cope with the rapid development of mobile communication systems and the large increase in the amount of data being serviced in the mobile communication systems, $3^{rd}$ Generation (3G) mobile communication systems with the necessary throughput for transmitting the increased amount of data at higher speed have been developed. For the 3G mobile communication systems, Europe has adopted asynchronous Wideband-Code Division Multiple Access (W-CDMA) and North America has adopted synchronous Code Division Multiple Access-2000 (CDMA-2000) as wireless access standards. Generally, in the mobile communication systems, mobile terminals communicate with each other via one base station.

With the development of mobile communication technology, the mobile communication systems can support various communication schemes such as Advanced Mobile Phone Service (AMPS), CDMA, Global System for Mobile communication (GSM), General Packet Radio Service (GPRS), W-CDMA, etc. Mobile communication systems can be classified into various systems according to the communication scheme used and frequency band for each communication service provider. Generally, CDMA service provider supplies the information needed by a mobile terminal for system acquisition through Preferred Roaming List (PRL). The PRL is used when the mobile terminal intends to select or maintain a system (or base station), or to perform roaming.

PRL is roughly composed of two tables: one is an acquisition (ACQ) table including acquisition type (system type), band class (frequency band), and channel information, and another is a system search table including System Identifier (SID), Network Identifier (NID), system availability indication (PREF_NEG), geographic information (GEO), Priority (PRI), Acquisition Index, Roaming Indicator, etc.

Generally, if a mobile terminal succeeds in primary channel acquisition using a PRL ACQ table or other channel information in an initial system acquisition process, the mobile terminal receives a synchronous channel message and an overhead message over the primary channel, and determines a channel over which it will receive a service, using channel information provided by a CDMA Channel List Message (CCLM) and its own phone number information. If frequency handoff occurs as a mobile terminal moves while in service, the channel over which the mobile terminal receives the service changes again.

In order to acquire a system within the shortest possible time even though the mobile terminal is powered on after power-off while in service, the mobile terminal manages the last-serviced (or most recently serviced) channel information in a separate table. The table used in this case is called a Most Recently Used (MRU) table.

The mobile terminal stores the MRU table in an Electrically Erasable Programmable Read Only Memory (EEPROM), a non-volatile memory, and upon power-on, reads the information from the MRU table stored in the EEPROM and configures the system scan list using the information.

In addition, if an abnormal situation occurs during the service, the mobile terminal configures the system scan list using MRU table, PRL ACQ table and other channel information.

The system scan list is a list obtained by ordering the systems for which the mobile terminal will attempt acquisition, according to priority. After configuration of the system scan list, the mobile terminal attempts system acquisition in the order of the configured system scan list.

FIG. 1 illustrates a method for configuring a system scan list by a mobile terminal in a general mobile communication system.

Upon power-on, using system information included in the MRU table and the PRL ACQ table the mobile terminal configures the system scan list in the following order.

1. The mobile terminal registers, in system scan list 101, a serving system 110 and systems registered in an MRU table 140.

2. The mobile terminal registers, in system scan list 101, the systems registered in a PRL ACQ table 120.

Referring to FIG. 1, serving system 110 is a system that has last provided a service to the mobile terminal. In most cases, serving system 110 corresponds to the first system (or uppermost system) in MRU table 140. The mobile terminal first registers a serving system, i.e. Digital Cellular Service (DCS) 110 in system scan list 101 (see reference numeral 1), and then registers systems of MRU table 140. Because DCS #738 140a, which is a first system in the MRU table 140, is already registered in system scan list 101, the mobile terminal does not register it in system scan list 101 (see reference numeral 2), and registers DCS #386 140b, which is the next system, in system scan list 101 (see reference numeral 3).

After registering MRU table 140 in system scan list 101, the mobile terminal registers a PRL ACQ table 120 in system scan list 101. For this, the mobile terminal unpacks a PRL file that is stored in the EEPROM after undergoing binary ordering.

After acquiring system information from PRL ACQ table 120 through the PRL file unpacking process, the mobile terminal registers the systems on PRL ACQ table 120 in system scan list 101 in order (see reference numerals 4 to 11). As shown in FIG. 1, the registration from PRL ACQ table 120 into system scan list 101 is performed in order of DCS #29 4, DCS #111 5, DCS #779 7, Personal Communication Service (PCS) #50 8, PCS #100 9, AMPS #29 10, and AMPS #111 11.

For DCS #738 among the systems registered with an index #1 of PRL ACQ table 120, because its system information is already registered in system scan list 101, the mobile terminal does not register it in system scan list 101 (see reference numeral 6).

FIG. 2 illustrates a method for configuring a system scan list when a mobile terminal has lost its system signalling while normally receiving a service in a general mobile communication system.

A mobile terminal using system information included in a MRU table 240 and a PRL ACQ table 220, when it has lost its system signalling, configures a system scan list 202 in the following order.

1. The mobile terminal registers, in system scan list 202, the systems in the same region (or same GEO) as that of the system previously in service, registered in PRL ACQ table 220.

2. The mobile terminal registers, in system scan list 202, the systems registered in MRU table 240.

3. The mobile terminal registers, in system scan list 202, the systems in a different region (or different GEO) from that of the system previously in service, registered in PRL ACQ table 220.

It is assumed in FIG. 2 that the mobile terminal has lost its system signalling while receiving a service as it acquires a system in a region B (or GEO B) 200, e.g. DCS #738, among the systems in PRL ACQ table 220.

In order to reacquire a system, the mobile terminal first registers, in system scan list 202, the systems in the same region as that of the lost system. Therefore, the mobile terminal first registers, in system scan list 202, DCS #738 12 with an index #1 and DCS #779 13 with an index #1, both which are the systems in the region B 200, among the systems in PRL ACQ table 220.

Thereafter, the mobile terminal registers the systems existing in MRU table 240. As for DCS #738 14 which is a first system in MRU table 240, because it is already registered in system scan list 202, the mobile terminal does not repeatedly register it. Therefore, the mobile terminal registers, in system scan list 202, DCS #386 22 which is the next system in MRU table 240 (see reference numeral 15).

Next, the mobile terminal registers, in system scan list 202, the other systems in the different region from that of the lost system, among the systems in PRL ACQ table 220. In the system registration order of the PRL ACQ table 220 shown in FIG. 2, DCS #29 16, DCS #111 17, PCS #50 18, PCS #100 19, AMPS #29 20, and AMPS #111 21 are sequentially registered in system scan list 202.

As described above, in the conventional art, if the powered-off mobile terminal is powered on or encounters an abnormal situation while receiving a service, the mobile terminal newly generates the system scan list according to the situation and attempts system acquisition using the new system scan list. Therefore, every time the mobile terminal newly generates the system scan list or registers PRL ACQ table information, the mobile terminal needs to read the binary-ordered PRL information from the EEPROM and register the PRL information in the system scan list through an unpacking process. In addition, when the developer desires to change the search order of the system scan list, he/she should know all processes for configuring the system scan list, making it difficult to change the search order.

SUMMARY OF THE INVENTION

An aspect of the present invention is to address at least the above described problems and/or disadvantages and to provide at least the advantages described below. Accordingly, an aspect of the present invention is to provide a system selection method in which a mobile terminal efficiently configures a system search table used for system selection, and selects a system using the system search table, thereby stably providing a mobile communication service.

Another aspect of the present invention is to provide a system selection method in which a mobile terminal configures a system search table provided for system selection such that it can freely make addition and extension of areas, thereby facilitating general-purpose system selection.

A further aspect of the present invention is to provide a system selection method in a mobile terminal, which registers various search scenarios in a system search table configured for system selection, thereby facilitating efficient system selection.

Yet, another aspect of the present invention is to provide a system selection method in which a terminal searches a system using a system search table and search scenarios so as to allow a developer to simply configure and change a system scan list while supporting all functions of the conventional system scan list.

Still another aspect of the present invention is to provide a method in which a mobile terminal configures a system search table using an MRU table, a PRL ACQ table and other channel information after the mobile terminal is powered-on or encounters other abnormal situations.

According to one aspect of the present invention, there is provided a method for selecting a system in a mobile terminal. The method includes upon power-on of the mobile terminal, reading system information included in a Most Recently Used (MRU) table from memory, and registering the system information in a variable area of the system search table; reading system information from a Preferred Roaming List Acquisition (PRL ACQ) table stored in the memory, and registering the system information in a fixed area of the system search table; and performing system search based on the system search table.

According to another aspect of the present invention, there is provided a method for selecting a system in a mobile terminal. The method includes reading registered system information from system information registration tables used for registering system information, stored in memory of the mobile terminal, setting a plurality of areas corresponding to the system information registration tables, and allocating an index to each of the read system information, thereby configuring the system search table; setting a search option for each area of the system search table, and registering a search scenario for searching valid system information from the system search table according to the search option; and sequentially performing the registered search scenarios to search system information satisfying the search option in each area of the system search table, and acquiring, as system information to be serviced, the uppermost system information among the searched system information.

According to a further aspect of the present invention, there is provided a method for selecting a system in a mobile terminal. The method includes configuring a system search table by setting a first area and a second area to be allocated in a first system information table and a second system information table in which system information is registered, wherein the first and second system information tables are stored in memory of the mobile terminal; reading system information registered in the first system information table and the second system information table, and sequentially registering the read system information in the first area and the second area, respectively; initializing, to an inactive state repetition flags of systems registered in the first area and the second area; determining if a first search scenario is registered, in which a search condition for searching systems registered in the first area is set; if the first search scenario is registered, sequentially searching a system having system information satisfying the search condition, for valid systems among the systems registered in the first area, according to the first search scenario; setting, to a first active state, a repetition flag of the system searched according to the search condition of the first search scenario; if repetition flag setting for all systems registered in the first area is completed, determining if a second search scenario is registered, in which a search condition for searching systems registered in the second area is set; if the second search scenario is registered, sequentially searching a system having system information satisfying the search condition, for valid systems among the systems registered in the second area, according to the second search scenario; determining if the searched system is the same system as the system whose repetition flag is set to the first active state according to the search condition of the first search scenario; if the searched system is the same system, setting the repetition flag of the searched system to a second active state, and if the searched system is not the same system, setting the repetition flag of the searched system to the first active state; and if repetition flag setting for all systems registered in the second area is completed, selecting, as a system to be serviced, a system first registered in the system search table among the systems whose repetition flags are set to the first active state.

BRIEF DESCRIPTION OF THE DRAWINGS

The above and other objects, features and advantages of the present invention will become more apparent from the following detailed description when taken in conjunction with the accompanying drawings in which:

FIG. 3 illustrates a system search table according to the present invention;

FIG. 4 illustrates an example in which a mobile terminal registers systems in a system search table 450 according to the present invention;

FIG. 7B is the continued flow chart of the registration of a search scenario according to the present invention;

FIG. 8 illustrates exemplary registration of a search scenario for searching a system upon power-on of a mobile terminal according to the present invention; and FIG. 9 illustrates a registration method of a search scenario when a mobile terminal has lost its system signaling according to the present invention.

DETAILED DESCRIPTION OF PREFERRED EMBODIMENTS

Figure 1:
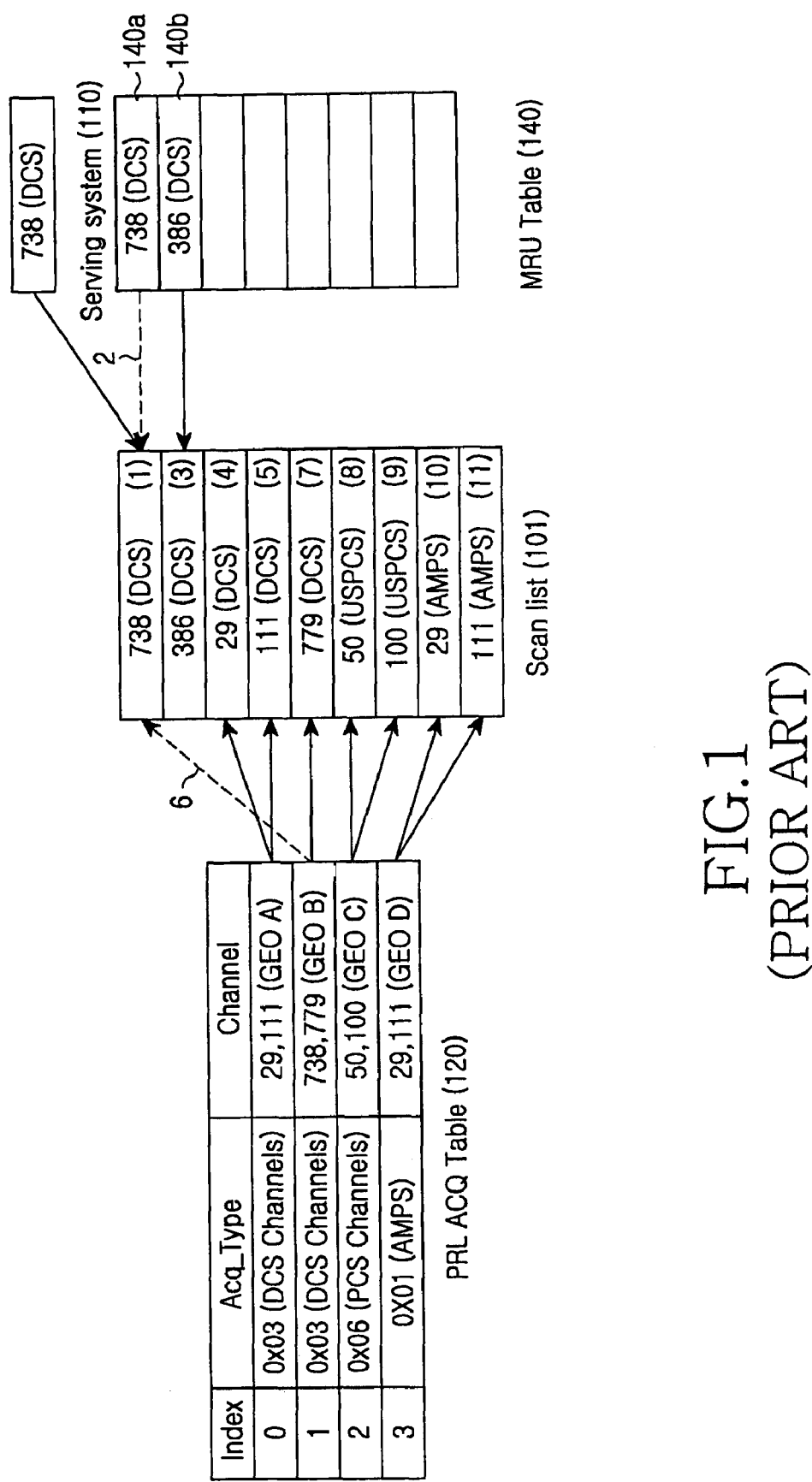
FIG. 1 illustrates a method for configuring a system scan list by a mobile terminal f in a general mobile communication system.

Exemplary embodiments of the present invention will now be described in detail with reference to the annexed drawings. In the following, detailed description of known functions and configurations has been omitted for clarity and conciseness.

According to the present invention, a mobile terminal configures a new search table instead of the existing scan list, and acquires a system through various search scenarios.

Referring to FIG. 3, according to the present invention system search table 380 introduces the concept of areas within the table. In the present invention, the areas defined in system search table 380 are classified into two types according to their attributes: one is a variable area 302 having a variable attribute and another includes fixed areas 304 and 306 having fixed attributes. The variable area 302 has a fixed maximum area value (end max=MAX1), and is divided into an in-use area 308 and a reserved area 310. Variable area 302 can undergo area update if needed even while the mobile terminal is receiving a service. The maximum possible scope of entries stored in variable area (or area #1) 302 ranges from an index #0 to an index #MAX1.

When system search table 380 stores system information like the MRU table, use of variable area 302 is needed. The systems that the mobile terminal has recently acquired while receiving a service are stored in variable area 302. The last-acquired system among the systems managed on a Last Input First Output (LIFO) basis becomes a first entry 350 of variable area 302, and the previously registered systems increase in indexes 320 one by one.

Once fixed areas 304 and 306 having fixed attributes are initially registered as fixed areas, their system information remains unchanged. When storing the system information like the PRL ACQ table, the mobile terminal can use fixed areas 304 and 306.

Systems are registered such that there is no duplicate system in each area of system search table 380. However, duplicate systems may exist between one area and another area. That is, although no repeated system is registered in each of the fixed area and the variable area, the same system as the system registered in the fixed area may be even registered in the variable area. The scope of fixed area (or area #2) 304 ranges from index #(MAX1+1) to index #(MAX2), and the scope of fixed area (or area #3) 306 ranges from an index #(MAX2+1) to an index #(MAX3). Unlike the area #1, fixed areas 304 and 306 have no reserved area 310, and do not undergo area update even while the mobile terminal is receiving a service. Therefore, there is no change in entry of fixed areas 304 and 306.

The information constituting system search table 380 according to an embodiment of present invention includes system information (AMPS, CDMA, HDR, etc.) 322, band information or band class (DCS, USPCS, KPCS, etc.) 324, channel information 326, and repetition flag information 328. Of the information, repetition flag information 328 is used to indicate a channel repeated in a search scenario performed when the mobile terminal performs channel search using the initially configured system search table 380, thereby preventing the mobile terminal from repeatedly searching the same systems.

On power-up, the mobile terminal initially configures system search table 380. The developer can freely determine the configured areas.

In the example shown in FIG. 4, a mobile terminal registers a total of 4 areas in system search table 450.

As illustrated in FIG. 4, a process of registering systems in system search table 450 according to the present invention is performed in the following order.

1. A mobile terminal registers the system(s) registered in a MRU table, in area #1 400 of system search table 450.

2. The mobile terminal registers the system(s) registered in a PRL ACQ table, in area #2 402 of system search table 450.

3. The mobile terminal registers, in area #3 404 of system search table 450, the channel(s) that can be additionally used for system search while it performs an emergency call.

4. The mobile terminal registers, in area #4 406 of system search table 450, the channel(s) in a received Service Redirection Message (SRDM).

A detailed description will now be made of the system registration process. As described above, the mobile terminal first registers the MRU table in area #1 400 of system search table 450. The MRU table uses a variable area having a variable attribute. The mobile terminal reads the MRU table stored in an EEPROM, and registers systems included therein in order.

Herein, the mobile terminal sets area #1 400 such that the maximum number of entries in area #1 400 is equal to the maximum number of systems included in the MRU table, and then registers only the valid system information. An index #2 to an index #5 indicating the entries in a reserved area in area #1 400 are initialized to an Inactive state.

A procedure, in which the mobile terminal registers systems in area #1 400 of system search table 450 according to an embodiment of the present invention, is performed as follows.

1. The mobile terminal reads the MRU table from the non-volatile memory like the EEPROM, and registers systems included therein in system search table 450.
2. During the service, the MRU table information can be immediately updated.
3. Data is managed on LIFO basis.
4. If the total number of valid entries is less than the maximum value of area #1 400, the other areas remain in the Inactive state.

As shown in FIG. 4, the mobile terminal registers PRL ACQ table information in area #2 402 of system search table 450 according to an embodiment of the present invention. It is assumed that the PRL ACQ table according to the present invention is equal to that shown in Table 1.

TABLE 1

| Index | Acquisition Type (Acq_Type) | Number of Channels (num channel) | Channel |
|---|---|---|---|
| 0 | 0x03(DCS Channel) | 2 | 29, 111(GEO A) |
| 1 | 0x03(DCS Channel) | 2 | 738, 779(GEO B) |
| 2 | 0x06(PCS Channel) | 2 | 50, 100(GEO C) |
| 3 | 0x01(AMPS) | | System A or B (29, 111) (GEO D) |

The mobile terminal reads a PRL file that is stored in the EEPROM after undergoing binary ordering as shown in Table 1, and then registers the PRL file information in order through an unpacking process. The mobile terminal sets area #2 402 such that the maximum number of entries in area #2 402 is equal to the total number of systems in the PRL ACQ table of Table 1.

The mobile terminal registers, in area #3 404, the system information that can be used when it additionally searches for a channel in an emergency situation. The 'emergency situation' refers to, for example, a situation in which the mobile terminal makes a 911 Call. In this situation, if the mobile terminal fails to receive a service, the mobile terminal needs to acquire the service even through searching more channels. That is, if the mobile terminal makes the 911 Call in a No-Service state, it searches for a system in the MRU table, the PRL table, and the area for Emergency.

In this emergency situation, because the number of systems is fixed, the present invention uses area #3 404, which is a fixed area. In addition, the mobile terminal sets area #3 404 such that the maximum number of entries in area #3 404 is equal to the number of channels to be additionally used for Emergency. The mobile terminal registers, in area #3 404, a reserved channel table used for searching more channels in the emergency situation.

The mobile terminal registers the system information acquired from a SRDM in area #4 406, which is the last area. If the mobile terminal receives the SRDM from a base station while in the service, it attempts to acquire a system proposed in the message. In this case, the SRDM is used to store the system information. Because the system information in the SRDM is subject to change during its management, the present invention uses a variable area for it. Therefore, area #4 406 is a variable area for registering systems included in the SRDM message, and the mobile terminal sets area #4 406 such that the maximum number of entries in area #4 406 is equal to the maximum number of channels receivable with the SRDM.

The information necessarily required for area registration includes a name of a corresponding area, and start and end index values of the area.

That is, when the mobile terminal initially registers system information in the system search table, it secures only the MAX areas in area #4 406, and sets all the MAX areas to the Inactive state. In addition, when the mobile terminal receives an SRDM during the service, it updates the corresponding channels in area #4 (406), and if the total number of entries in area #4 406 is less than the MAX, the mobile terminal sets the other areas to the Inactive state.

Figure 5:
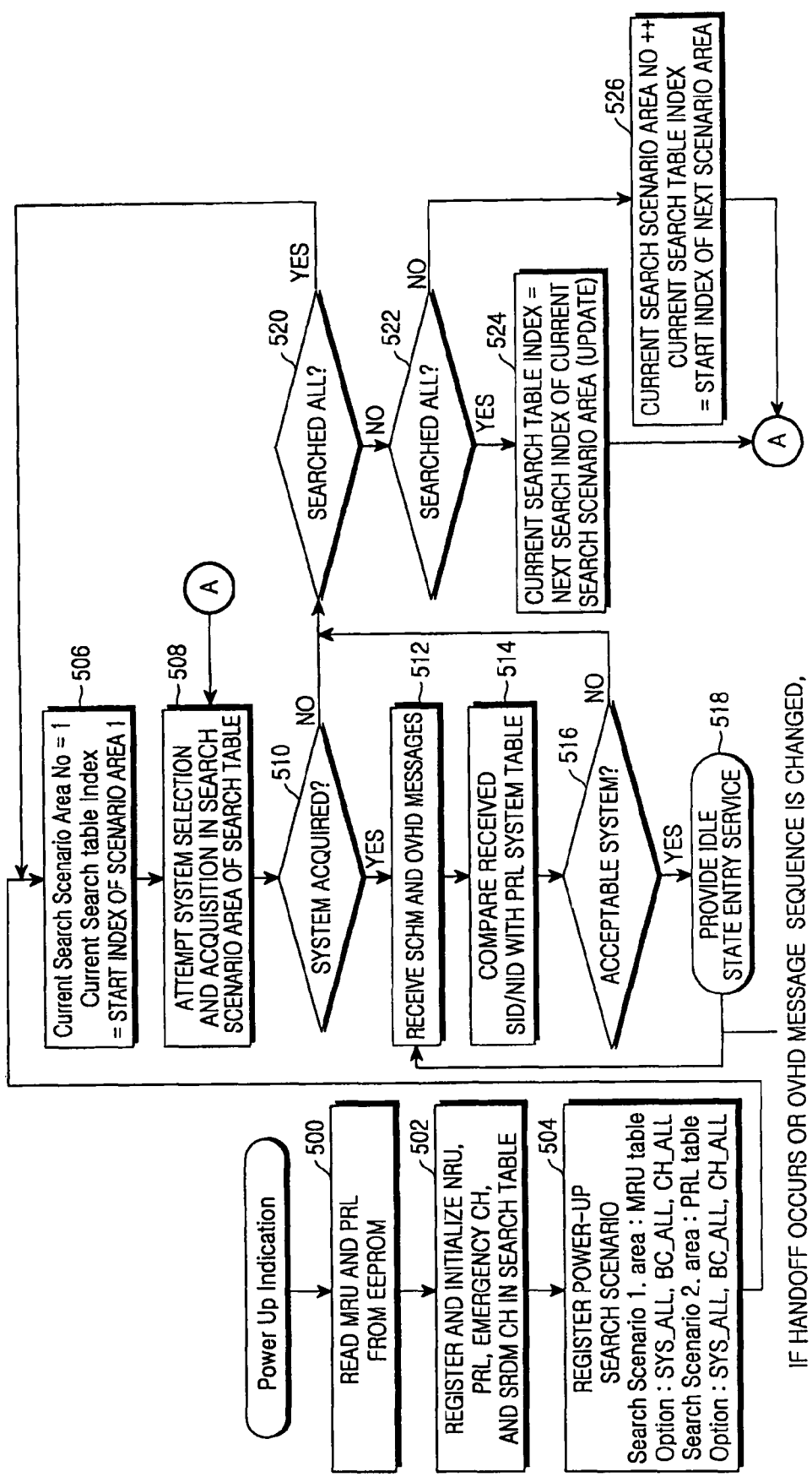
FIG. 5 is the flow chart of an operation performed according to system search table registration and system acquisition information upon power-on of a mobile terminal.

Referring to FIG. 5, in step 500, a mobile terminal reads information of the MRU table and information of a PRL ACQ table, stored in an EEPROM. In step 502, the mobile terminal configures a system search table. Although there is no order of areas, the mobile terminal registers systems of the MRU table in area #1 400, registers systems of the PRL ACQ table in area #2 402, registers systems for Emergency in area #3 404, and allocates area #4 406 as an area for SRDM management, for convenience, and then initializes them.

After configuring the system search table according to the present invention in steps 500 to 502, the mobile terminal registers a search scenario based on power-up event in step 504.

The search scenario selects a system that the mobile terminal should acquire, from the system information registered in each area of the system search table as an area needed to be searched (hereafter "search area") in the system search table and an option for defining conditions of the search area are determined. A registration process of the search scenario is separately described with reference to FIG. 7.

The information constituting the system search table includes system information, band information, channel information and repetition flag information, and the information necessarily required for system search table registration includes an area name, an area start index value, and an index end index value.

Therefore, registration of the proposed search scenario and a system acquisition process according thereto will now be described by way of example. As for search information, a first search scenario sets an area to the MRU system, and sets a search scenario option to SYS_ALL, BC_ALL, and CH_ALL. The search scenario option is an option corresponding to each of system information, band information and channel information constituting the system search table, and is used for defining desired system, band and channel to be registered in the system search table, as specific system, band and channel. Therefore, if the search scenario option is 'ALL', it means that all systems in the area are scenario candidates.

As for search information, a second search scenario sets an area to a PRL system, and similarly sets a search scenario option to 'ALL'. In addition, the mobile terminal separately stores and manages this search scenario information.

In step 506, the mobile terminal initializes information on the search scenario currently in search, and information on the search table index that it should currently search in the corresponding search scenario. In this case, the value of the search table index is equal to the start index value of the MRU system area.

In step 508, the mobile terminal attempts system acquisition using the system information selected based on the registered search scenario. In step 510, the mobile terminal determines if it has acquired a system, and if the mobile terminal has succeeded in the acquisition of a system, it performs a SYNC Channel Message (SCHM) reception process and an Overhead Message (OVHD) reception process in step 512. In step 514, upon receipt of all OVHD information, the mobile terminal compares system information in the PRL ACQ table with the currently received system information to determine if it can accept the currently received system. In step 516, the mobile terminal determines if the received SID/NID indicates an acceptable system. If it is determined in step 516 that the received SID/NID indicates an acceptable system, the mobile terminal proceeds to step 518 where it normally enters an Idle State.

However, if it is determined in step 510 that the mobile terminal has failed in system acquisition, or if it is determined in step 516 that the acquired system is an unacceptable system, the mobile terminal proceeds to step 520 where it attempts to search for other systems. In step 520, the mobile terminal determines if it has attempted to search systems in all previously registered search scenarios. If the mobile terminal has attempted to search the systems in all search scenarios, the mobile terminal proceeds to step 506 where it initializes all search scenario-related parameters and then re-attempts the search from the beginning.

However, if it is determined in step 520 that the mobile terminal has not yet attempted to search all previously registered systems, the mobile terminal determines in step 522 if it has completely searched the currently searched scenario area. If it is determined in step 522 that the mobile terminal has searched all systems in the currently searched scenario area (e.g. first search scenario and MRU areas), the mobile terminal proceeds to step 524 where it updates the search parameter values in order to search the next search scenario area.

However, if it is determined in step 522 that there is any system that the mobile terminal should search, left in the currently searched scenario area, the mobile terminal updates the parameter values in step 526. After updating the search parameter values in step 524 and 526, the mobile terminal returns to step 508 and re-performs the search.

Figure 6:
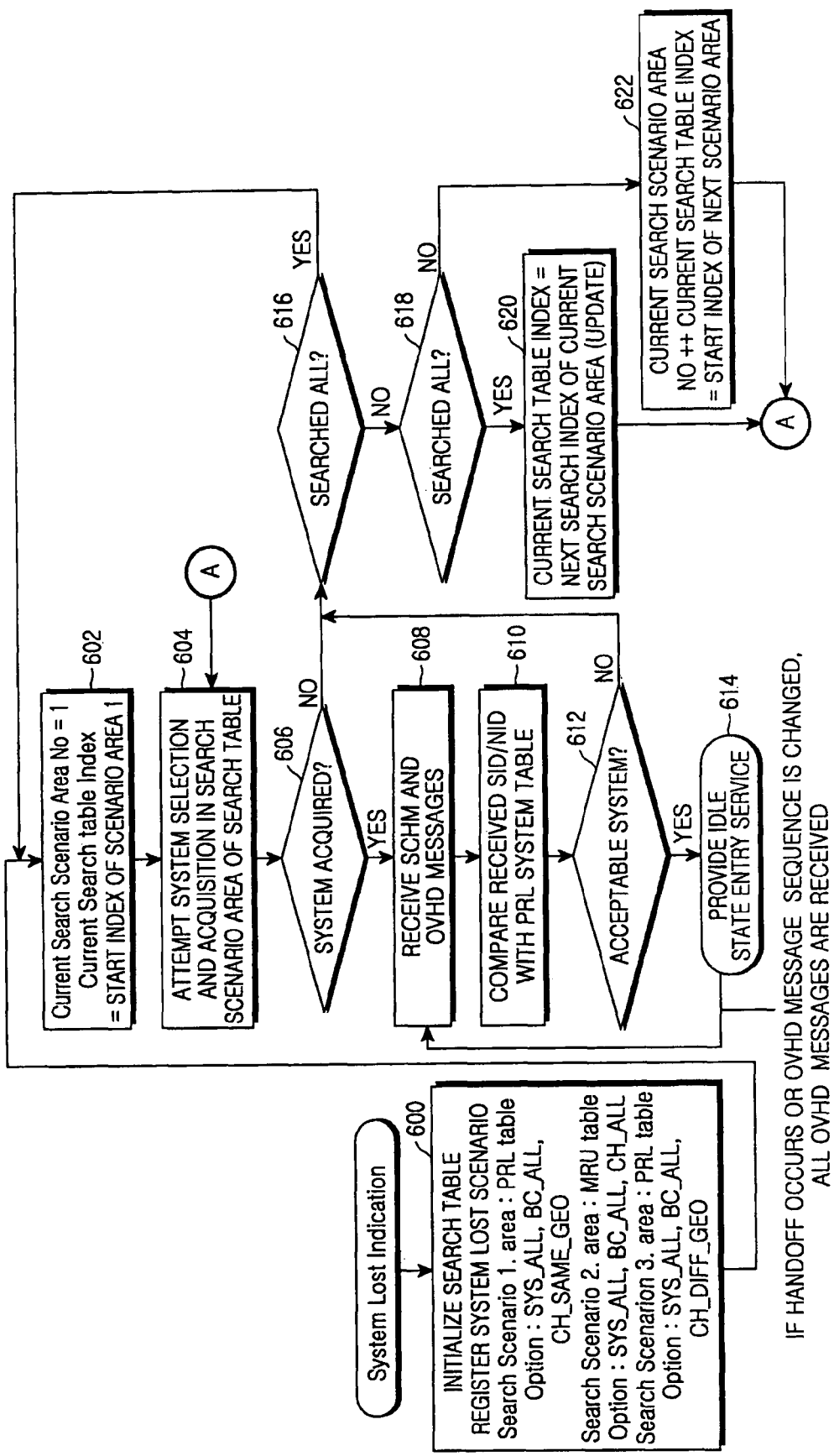
FIG. 6 is the flow chart of an operation performed according to search scenario registration and system acquisition information when a mobile terminal encounters a system-lost situation during the normal service.

Referring to FIG. 6, in step 600, the mobile terminal initializes all repetition flag values in a system search table, and then registers a search scenario that should be performed due to the system losing. The registered search scenario will be described in detail by way of example. As for information on the first search scenario, the mobile terminal sets an area to a PRL system, and sets a search scenario option to SYS_ALL, BC_ALL, and CH_SAME_GEO. The CH_SAME_GEO means systems belonging to the same region as that of the previously serviced system. As for information on the second search scenario, the mobile terminal sets an area to a MRU system, and sets all search scenario options to 'ALL'. As for information on a third search scenario, the mobile terminal sets an area to a PRL system, and sets an option of a search scenario area to SYS_ALL, BC_ALL, and CH_DIFF_GEO. The CH_DIFF_GEO means systems belonging to the different region from that of the previously serviced system. That is, it means the remaining PRL systems except for the systems registered as the first search scenario.

Since the operations performed in step 602 to 622 based on the search and system acquisition information are equal to that in steps 506 to 526 of FIG. 5, so the description thereof will be omitted. A registration process of the search scenario will be described in detail with reference to FIG. 7.

A search scenario according to the present invention can be reconfigured for the case where a mobile terminal is powered on or encounters abnormal situations.

In step 700, the mobile terminal gives a name of a desired registration area, a band class, which is an option of the area, and a channel option. If registration of the search scenario starts, the mobile terminal initializes all repetition flags of a system search table 450 to Inactive in step 702.

An option of the search scenario according to the present invention is classified into a system option, a band class option, and a channel option. System option 322 is used for defining a desired system to be registered in the current registration scenario, as a specific system (e.g. CDMA system only, AMPS system only, CDMA and AMPS system only, HDR system only, All System, etc.).

Band class option 324 is used for defining a desired band to be registered in the registration scenario, as a specific band (e.g. DCS only, USPCS only, KPCS only, DCS and USPCS only, DCS and KPCS only, All band class, etc.).

Channel option 326 is used for defining a desired channel to be registered in the registration scenario, as a channel belonging to a specific region or a channel having a specific ACQ_INDEX value in the PRL ACQ table (e.g. ACQ Index X only, Same GEO Channel in PRL, Different GEO Channel in PRL, All Channel, etc.).

Repetition flag 328 may assume any one of 3 states: Inactive, False, and True. Inactive indicates a state in which no system is included in the search scenario; True indicates a state in which although a corresponding system is included in the search scenario, because the system is already included in the search scenario in another area, a repeated state is indicated to prevent the mobile terminal from participating in the search; and False indicates a state in which a corresponding system is included in the search scenario, allowing the mobile terminal to normally participate in the search.

Figure 7A:
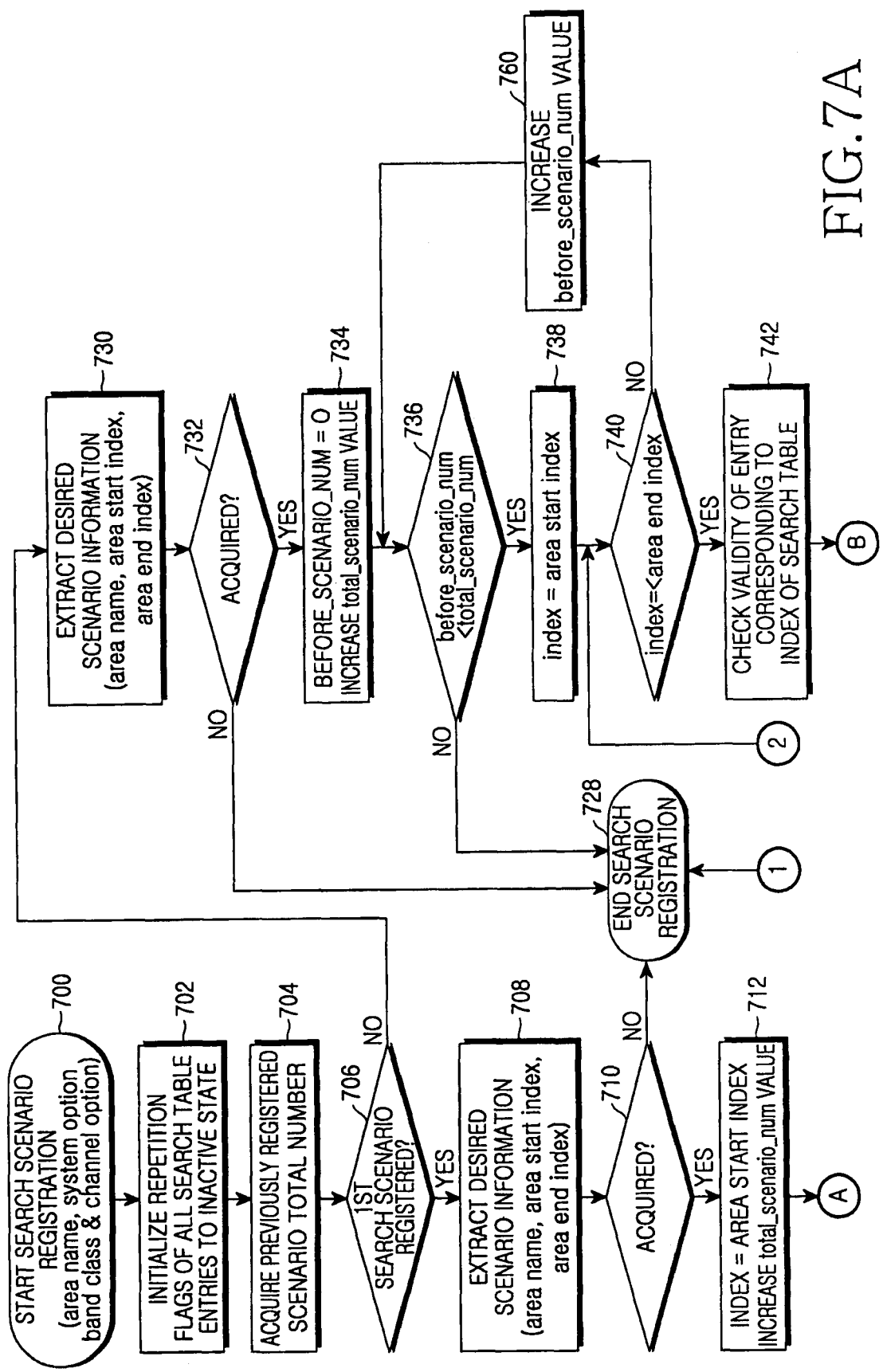
FIG. 7A is the flow chart of the registration of a search scenario according to the present invention.

Referring to FIGS. 7A and 7B, in step 704, the mobile terminal calculates the total number 'Scenario Total Number' of previously registered search scenarios.

In step 706, the mobile terminal determines whether the desired search scenario to be registered now is a first registered scenario. If the search scenario is a first scenario, the mobile terminal extracts, in step 708, information (area name, and area start/end index) on the desired search scenario using the name of the area. In step 710, the mobile terminal determines if it has acquired search scenario information. If the mobile terminal has failed to acquire the search scenario information, it ends the search scenario registration in step 728. However, if it is determined in step 710 that the mobile terminal has succeeded in acquisition of the search scenario information, the mobile terminal increases the total number of registered search scenarios in step 712, and performs system registration from the beginning to the end of the area in steps 714 to 726. In addition, the mobile terminal allocates a start index 'area start index' of the corresponding area to an 'index' parameter in step 712 in order to perform validity check from the start index of the corresponding area.

In step 714, the mobile terminal compares the index parameter value to be less than or equal to 'area end index', and because the index parameter value is assigned 'area start index', the mobile terminal proceeds to step 716.

In step 716, the mobile terminal extracts corresponding entries of system search table 450 from the beginning of each area one by one, and checks validity thereof, and determines in step 718 if the corresponding entry is valid. If the entry is valid, the mobile terminal determines again in step 720 if an option presented in the search scenario is coincident with system information of the corresponding entry. However, if it is determined in step 718 that the corresponding entry is invalid, the mobile terminal extracts the next entry and proceeds to step 726 where it increases an index value to continuously perform the search scenario registration operation.

If it is determined in step 722 that the entry is coincident with the option of the search scenario, the mobile terminal proceeds to step 724 where it sets a value of the repetition flag to FALSE because the corresponding entry is an entry capable of participating in the channel search. In order to perform validity check on the next entry, the mobile terminal proceeds to step 726 where it increases the index value. However, if it is determined in step 722 that the entry is not coincident with the option, the mobile terminal proceeds to step 726 where it increases the index value in order to determine whether the next entry is coincident with the option of the search scenario.

The mobile terminal compares in step 714 the index value increased in step 726 with 'area end index'. If it is determined in step 714 that the index is greater than the last index 'area end index' of the area, the mobile terminal ends the search scenario registration operation in step 728 because the scenario registration operation is performed on up to the last entry of the area.

However, if it is determined in step 706 that the desired search scenario to be registered now is not the first registered search scenario, the mobile terminal proceeds to step 730 where it extracts information on the desired search scenario using the name of the area in the manner of step 708.

If it is determined in step 732 that the mobile terminal has failed in acquisition of the search scenario information, the mobile terminal proceeds to step 728 where it ends the search scenario registration. However, if the mobile terminal has succeeded in acquisition of the search scenario information, the mobile terminal proceeds to step 734 where it increases the total number 'total_scenario_num' of registered scenarios, and initializes the number 'before_scenario_num' of previous scenarios to '0'. The 'before_scenario_num' is a temporary parameter used for implementation, and is used for detecting a system for which the desired scenario to be registered now overlaps with the previously registered scenarios.

For example, if 'before_scenario_num' is '0', the mobile terminal performs overlapping system (or repeated system) detection operation for the desired scenario to be registered now and the first registered scenario. After completion of the comparison with the first registered scenario, the mobile terminal increases a value of 'before_scenario_num' to '1' in step 760. In this case, the mobile terminal performs overlapping system detection operation for the desired scenario to be registered now and the second registered scenario. The 'total_scenario_num' means the total number of registered scenarios including the desired scenario to be registered now.

If it is determined in step 736 that the 'total_scenario_num' is greater than the 'before_scenario_num', the mobile terminal proceeds to step 738 where it allocates a start index 'area start index' of the corresponding area to the 'index' parameter in order to perform validity check from the start index of the corresponding area. Thereafter, in step 740, the mobile terminal determines whether the 'index' parameter has increased up to the last index 'area end index' of the corresponding area.

In order to check validity of an entry corresponding to the index of system search table 450 in step 742, the mobile terminal proceeds to step 744 where it performs validity check on the entry corresponding to the index of the system search table from the beginning to the end of the corresponding area in the manner of step 716. If the corresponding entry is valid as a result of the validity check, the mobile terminal performs search scenario registration through an option check process on the entry in steps 746 to 748. Here, because other search scenarios might be already registered before the desired search scenario to be registered now, step 750 of checking repetition (or overlapping) between the entries of the previously registered search scenario and the entries of the desired search scenario to be registered now is added.

Therefore, if it is determined in step 748 that the entry is coincident with the option, the mobile terminal determines in step 750 whether an entry corresponding to the index of system search table 450 overlaps with the previously registered system. Thereafter, if it is determined in step 752 that the corresponding entry overlaps with the previously registered scenario, i.e. if the entry of the desired search scenario to be registered now overlaps with the entry of the previously registered scenario, the mobile terminal sets a repetition flag value of the corresponding entry to TRUE in step 754, and if they do not overlap each other, the mobile terminal proceeds to step 756 where it sets the repetition flag value to FALSE.

If the repetition flag setting is completed after the repetition check (overlapping check), the mobile terminal increases an index value in step 758 to perform validity check on the next entry, and then proceeds to step 740. If the validity check on the previously registered search scenarios is completed through steps 736 to 758, the mobile terminal proceeds to step 728 through steps 740, 760 and 736, completing the search scenario registration.

Shown in FIG. 8 is exemplary registration of a proposed system search scenario when a mobile terminal is powered on. According to the present invention, as to the search scenario registration order given for power-up, the mobile terminal performs registration in order of all systems in a MRU table and all systems in a PRL ACQ table.

Before the description of FIG. 8 is given, it is assumed that when registering a first search scenario in exemplary search scenario registration according to the present invention, the mobile terminal registers systems of the MRU table in a system search table 800, and a search option includes SYS_ALL indicating all systems, BC_ALL indicating all band classes, and CH_ALL indicating all channels.

In addition, it is assumed that when registering a second search scenario, the mobile terminal registers systems of the PRL ACQ table in system search table 800, and a search option includes SYS_ALL indicating all systems, BC_ALL indicating all band classes, and CH_ALL indicating all channels.

Referring to FIG. 8, system search table 800 is configured with an area #1 806, an area #2 808, an area #3 810, and an area #4 812. Because the search option of the first search scenario indicates all systems in the MRU table, a mobile terminal, upon powered-up, registers, in the first search scenario, all systems of area #1 806 in which all systems of the MRU table are stored. Indexes #0 to #5 of system search table 800 correspond to an area of the MRU table, and of indexes #0 to #5, only the indexes #0 and #1, shown by reference numeral 802, are valid systems. In addition, because the option satisfies all of the foregoing conditions, the mobile terminal sets repetition flags of 2 systems registered in indexes #0 and #1 to FALSE, and then registers them in the first search scenario.

The second search scenario is for registering all systems of the PRL ACQ table, and the PRL ACQ table is stored in area #2 808. Because the search option of the second search scenario indicates all systems in the PRL ACQ table, the mobile terminal registers all systems of area #2 808 in the second search scenario. Indexes #6 to #13 of system search table 800 correspond to area #3 810 of the PRL ACQ table, all systems are valid systems, and the option is also satisfied for all. That is, the repetition flag is not set to Inactive, and the SYS_ALL, BC_ALL, and CH_ALL options are all satisfied.

However, because system 842 corresponding to the entry with index #8 of system search table 800 overlaps with a system corresponding to the entry with an index #0 among the systems in the previously registered search scenario, the mobile terminal sets only the repetition flag of system 842 with index #8 to TRUE and sets repetition flags of the other entries to FALSE as shown by reference numeral 804.

Table 2 shows the search order in which the mobile terminal will perform system acquisition according to the first and second search scenario registration results.

TABLE 2

| Table Index | System | band_class | Channel |
| --- | --- | --- | --- |
| 0 | CDMA(0x01) | DCS(0x00) | 738 |
| 1 | CDMA(0x01) | DCS(0x00) | 386 |
| 6 | CDMA(0x01) | DCS(0x00) | 29 |
| 7 | CDMA(0x01) | DCS(0x00) | 111 |
| 9 | CDMA(0x01) | DCS(0x00) | 779 |
| 10 | CDMA(0x01) | USPCS(0x01) | 50 |
| 11 | CDMA(0x01) | USPCS(0x01) | 100 |
| 12 | AMPS(0x00) | DCS(0x00) | 29 |
| 13 | AMPS(0x00) | DCS(0x00) | 111 |

It can be noted that the search order of Table 2 is coincident with the search order shown in the conventional system scan list configuration method described in FIG. 1. For actual search, the mobile terminal extracts system information for acquisition attempt, using only the search scenario information and the system search table, instead of configuring the separate system search table shown in Table 2.

The search scenario information according to the present invention means a search area and an option of the search area. For example, as for search scenario information for power-up of the mobile terminal, first search scenario information includes <area: MRU, option: ALL>, and second search scenario information includes <area: PRL, option: ALL>. In addition, the mobile terminal can have index information indicating if the current search scenario is the first search scenario or the second search scenario, and index information indicating the systems searched in the search scenario area.

Shown in FIG. 9 is an exemplary system search scenario registration of the present invention when a mobile terminal has lost its system during the service. As to the search scenario registration order for the system-lost situation, the mobile terminal performs registration in order of systems in the same region as that of the system lost in a PRL ACQ table of a system search table 900, all systems in a MRU table, and systems in the different region from that of the system lost in the PRL ACQ table, thereby configuring a search scenario.

It is assumed in the second embodiment of the present invention that the mobile terminal has lost DCS #738 in region B after acquisition.

A first search scenario searches for a system in the same region as that of the system lost in the PRL ACQ table.

A search area of the first search scenario is a PRL ACQ table 922, and a search option thereof includes SYS_ALL indicating all systems, BC_ALL indicating all band classes, and SAME_GEO_CH indicating channels in the same region.

Referring to FIG. 9, the PRL ACQ table is stored in an area #2 922 of system search table 900, and all systems are valid systems. Because the place corresponding to the region B (channel option) includes systems 908 with indexes #8 and #9 of system search table 900, the mobile terminal sets repetition flags of systems 908 with indexes #8 and #9 to FALSE, and registers them in the search scenario.

A second search scenario is for registering all systems 920 of the MRU table. Therefore, a search area of the second search scenario is a MRU table 920, and a search option thereof includes SYS_ALL indicating all systems, BC_ALL indicating all band classes, and CH_ALL indicating call channels.

The MRU table is stored in area #1 920, and systems 902 with indexes #0 and #1 are valid systems. Because the system with an index #0 among the systems overlaps with a system with an index #8 previously registered in the first search scenario, the mobile terminal sets a repetition flag thereof to TRUE as shown by reference numeral 904, sets a repetition flag of the system with an index #1 to FALSE, and then registers them in the scenario as shown by reference numeral 902.

Finally, a third search scenario to be registered is for registering systems in the different region from that of the system lost in the PRL ACQ table. A search area of the third search scenario is PRL ACQ table 922, and a search option thereof includes SYS_ALL indicating all systems, BC_ALL indicating all band classes, and DIFF_GEO_CH indicating channels in the different region.

To register the third search scenario, the mobile terminal first determines that the PRL ACQ table is stored in area #2 922, and all systems stored in area #2 922 are valid systems satisfying the SYS_ALL and BC_ALL search options. Referring to the channel options, because the remaining systems except for systems 908 with indexes #8 and #9 correspond to systems in the different region (Different GEO), the mobile terminal sets repetition flags of systems 906 with indexes #6 and #7 and systems 910 with indexes #10, #11, #12 and #13 to FALSE in order starting from the top.

Table 3 shows the search order in which the mobile terminal will perform system acquisition based on the first to third search scenario registration results according to the second embodiment of the present invention.

TABLE 3

| Table Index | System | band_class | Channel |
| --- | --- | --- | --- |
| 8 | CDMA(0x01) | DCS(0x00) | 738 |
| 9 | CDMA(0x01) | DCS(0x00) | 779 |
| 1 | CDMA(0x01) | DCS(0x00) | 386 |
| 6 | CDMA(0x01) | DCS(0x00) | 29 |
| 7 | CDMA(0x01) | DCS(0x00) | 111 |
| 10 | CDMA(0x01) | USPCS(0x01) | 50 |
| 11 | CDMA(0x01) | USPCS(0x01) | 100 |
| 12 | AMPS(0x00) | DCS(0x00) | 29 |
| 13 | AMPS(0x00) | DCS(0x00) | 111 |

Figure 2:
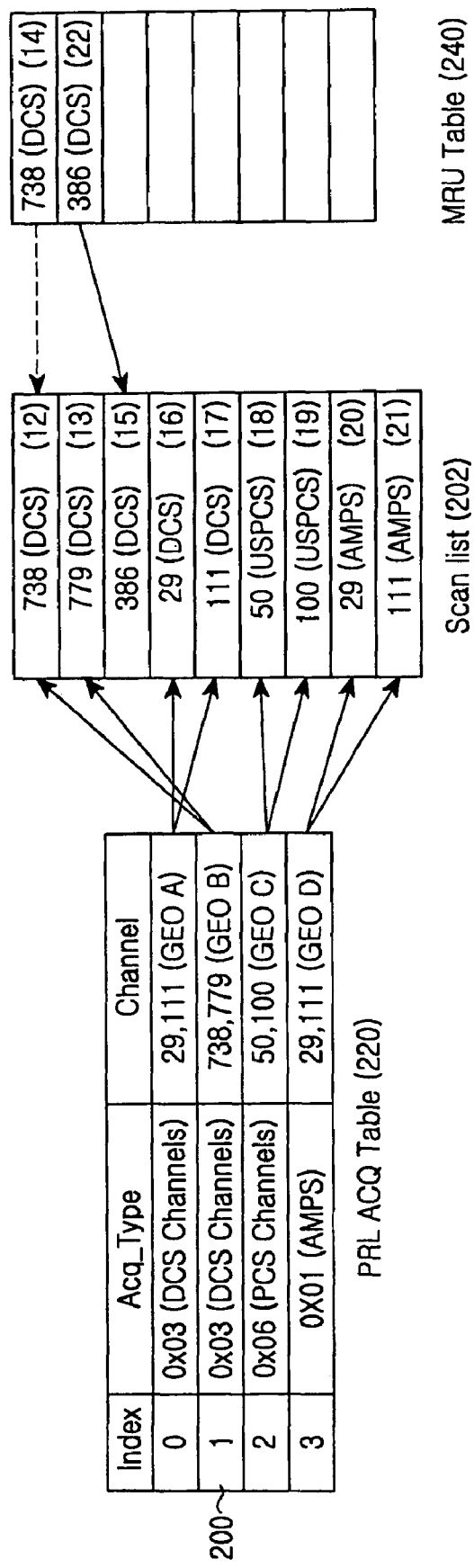
FIG. 2 illustrates a method for configuring a system scan list when a mobile terminal has lost its system signal while normally receiving a service in a general mobile communication system.

It can be noted that the search order described in Table 3 is coincident with the search order shown in the conventional system scan list configuration method described in FIG. 2. However, unlike the conventional system scan list configuration method, according to the present invention, the mobile terminal, even though it has lost the system, does not need to newly read the PRL ACQ table from the EEPROM and unpacking the PRL ACQ table, and the mobile terminal need not set the repetition flag value using search scenario information and the initially configured system search table without configuring the scan list, thereby determining a system acquisition order.

As can be understood from the foregoing description, the present invention facilitates easy addition and extension of areas in a system search table that a mobile terminal can configure for system selection, and configures search scenarios using search option such as system, band class and channel options, thereby providing various system search scenarios. In addition, even the engineer who has not participated in development of the system search table can easily configure search scenarios simply by setting search areas and search options.

While the invention has been shown and described with reference to certain preferred embodiment thereof, it will be understood by those skilled in the art that various changes in form and details may be made therein without departing from the spirit and scope of the invention as further defined by the appended claims.

What is claimed is:

1. A method for selecting a system in a mobile terminal, the method comprising:
   reading system information included in a Most Recently Used (MRU) table from a memory upon power-up of the mobile terminal, and registering the system information in a variable area of a system search table, wherein the mobile terminal updates the system information registered in the variable area while the mobile terminal is receiving a service;
   reading system information from a Preferred Roaming List Acquisition (PRL ACQ) table stored in the memory, and registering the system information in a fixed area of the system search table, wherein the mobile terminal does not update the system information registered in the fixed area while the mobile terminal is receiving the service; and
   performing system search based on the system information of the system search table.

2. The method of claim 1, wherein registration in the fixed area further comprises:
   comparing the system information previously registered in the fixed area of the system search table with the system information that is acquired from the PRL ACQ table and then registered in the fixed area of the system search table, to determine if there is any repeated system information; and
   setting to True a repetition flag of the corresponding system information registered in the fixed area of the system search table if there is any repeated system information.

3. The method of claim 2, further comprising:
   setting to False the repetition flag of the corresponding system information registered in the fixed area of the system search table if there is no repeated system information.

4. The method of claim 1, further comprising:
   initializing the repetition flag of the system search table if the mobile terminal has lost a serving system;
   searching a system in the same region as that of the system lost in the PRL ACQ table in the fixed area of the system search table;
   setting to False a repetition flag of a system in the same region as that of the lost system;
   registering, in a first search scenario, the system information whose repetition flag is set to False in the fixed area;
   registering, in a second search scenario, valid system information among the system information in the variable area of the system search table;
   registering, in a third search scenario, other system information unregistered in the first search scenario in the fixed area after registration of the second search scenario; and
   performing system search with the search scenarios.

5. A method for selecting a system in a mobile terminal, the method comprising:
   reading registered system information from system information registration tables used for registering system information, stored in a memory of the mobile terminal, setting a plurality of areas corresponding to the system information registration tables, and allocating an index to each of the read system information, thereby configuring a system search table, wherein the mobile terminal updates system information registered in a first area of the plurality of areas while the mobile terminal is receiving a service, and the mobile terminal does not update system information registered in a second area of the plurality of areas while the mobile terminal is receiving the service;
   setting a search option for each area of the system search table, and registering a search scenario for searching valid system information from the system search table according to the search option; and
   sequentially performing the registered search scenarios to search system information satisfying the search option in each area of the system search table, and acquiring, as system information to be serviced, the uppermost system information among the searched system information.

6. The method of claim 5, wherein the system search table configuration comprises:
   registering sequentially, in the first area, system information registered in a Most Recently Used (MRU) table; and
   registering sequentially, in the second area, system information registered in a Preferred Roaming List Acquisition (PRL ACQ) table.

7. The method of claim 6, wherein the system search table configuration further comprises:
   registering sequentially, in another one of the set areas, system information of an emergency channel searched in response to an emergency call request; and
   registering, in another one of the set areas, system information proposed by a Service Redirection Message (SRDM) received from a base station.

8. The method of claim 5, wherein the first area comprises a variable area and the second area comprises a fixed area.

9. The method of claim 8, wherein the variable area further comprises:
   an in-use area which is set such that it is coincident with a maximum number of system information registered in the MRU table, and valid system information is registered therein; and
   a reserved area corresponding to an area left after excluding the in-use area from the variable area when a total number of the valid system information is less than a maximum value of the variable area, wherein the reserved area remains in an inactive state.

10. The method of claim 5, wherein the search scenario registration comprises:
    setting each area to be searched individually among the plurality of areas set in the system search table; and
    setting search conditions for defining system information to be searched in the individually set search area.

11. The method of claim 10, wherein the search conditions include a system condition, a band condition, and a channel condition.

12. The method of claim 5, wherein the system acquisition comprises:

initializing, to an inactive state, a repetition flag value for each of system information registered in the system search table;

extracting sequentially valid system information by checking validity of system information registered in each area of the system search table;

extracting sequentially system information satisfying a search option of the registered search scenario among the extracted valid system information, and setting, to an active state, the repetition flag value initialized to the inactive state; and acquiring, as the system to be serviced, system information assigned with a most preferred index, among the system information whose repetition flag value is set to the active state.

13. The method of claim 12, wherein the repetition flag setting comprises:

determining if the extracted system information overlaps with the previously extracted system information upon sequentially extracting system information satisfying the search option of the registered search scenario; and setting a repetition flag value of the corresponding system information to a value indicating the overlapping if the system information overlaps with each other.

14. A method for selecting a system in a mobile terminal, the method comprising:

configuring a system search table by setting a first area and a second area to be allocated in a first system information table and a second system information table in which system information is registered, wherein the first and second system information tables are stored in a memory of the mobile terminal;

reading system information registered in the first system information table and the second system information table, and sequentially registering the read system information in the first area and the second area, respectively;

initializing, to an inactive state, repetition flags of systems registered in the first area and the second area;

determining if a first search scenario is registered, in which a search condition for searching systems registered in the first area is set;

searching in sequence a system having system information satisfying the search condition, for valid systems among the systems registered in the first area, according to the first search scenario if the first search scenario is registered;

setting, to a first active state, a repetition flag of the system searched according to the search condition of the first search scenario;

determining if a second search scenario is registered, in which the search condition for searching systems registered in the second area is set if repetition flag setting for all systems registered in the first area is completed;

searching in sequence a system having system information satisfying the search condition, for valid systems among the systems registered in the second area, according to the second search scenario if the second search scenario is registered;

determining if the searched system is the same system as the system whose repetition flag is set to the first active state according to the search condition of the first search scenario;

setting the repetition flag of the searched system to a second active state if the searched system is the same system, and if the searched system is not the same system, setting the repetition flag of the searched system to the first active state; and selecting, as a system to be serviced, a system first registered in the system search table among the systems whose repetition flags are set to the first active state if repetition flag setting for all systems registered in the second area is completed.

15. The method of claim 14, wherein each of the first system information table and the second system information table is at least one of a Most Recently Used (MRU) table and a Preferred Roaming List Acquisition (PRL ACQ) table.

16. The method of claim 14, wherein each of the first area and the second area further comprises:

an attribute of at least one of a variable area in which the mobile terminal can update system information registered in the system search table while receiving a service, and fixed areas in which registered system information remains unchanged.

17. The method of claim 16, wherein the variable area comprises:

an in-use area which is set such that it is coincident with a maximum number of system information registered in the MRU table, and valid system information is registered therein; and a reserved area corresponding to an area left after excluding the in-use area from the variable area when a total number of the valid system information is less than a maximum value of the variable area, wherein the reserved area remains in an inactive state.

18. The method of claim 14, wherein the search conditions include a restriction condition for restricting a system searched according to system type, band, and channel.

\* \* \* \* \*